US005266383A

United States Patent [19]

Sakaki et al.

[11] Patent Number: 5,266,383

[45] Date of Patent: Nov. 30, 1993

[54] RECORDING MEDIUM AND INK JET RECORDING METHOD BY USE THEREOF

[75] Inventors: Mamoru Sakaki, Sagamihara; Masako Shimomura, Yokohama; Megumi Munakata; Tomomi Nakatsugawa, both of Kawasaki; Hiroshi Sato, Yokohama, all of Japan

[73] Assignee: Canon Kabushiki Kaisha, Tokyo, Japan

[21] Appl. No.: 933,902

[22] Filed: Aug. 27, 1992

Related U.S. Application Data

[63] Continuation of Ser. No. 315,826, Feb. 24, 1989, abandoned.

[30] Foreign Application Priority Data

| | | | |
|---|---|---|---|
| Mar. 4, 1988 | [JP] | Japan | 63-49676 |
| May 9, 1988 | [JP] | Japan | 63-110605 |
| Jan. 25, 1989 | [JP] | Japan | 1-14042 |
| Jan. 27, 1989 | [JP] | Japan | 1-18004 |

[51] Int. Cl.$^{5}$ ................ B32B 9/00

[52] U.S. Cl. ................ 428/195; 428/206; 428/212; 428/304.4; 428/329; 428/331; 346/135.1

[58] Field of Search ............ 428/195, 206, 312, 304.4, 428/329, 331; 346/135.1

[56] References Cited

U.S. PATENT DOCUMENTS 4,758,461 7/1988 Akiya et al. .......... 428/212
4,879,166 11/1989 Misuda et al. .......... 428/195

FOREIGN PATENT DOCUMENTS 0275711 7/1988 European Pat. Off. .

OTHER PUBLICATIONS

Abstract Bulletin of the Institute of Paper Chemistry, vol. 57, No. 4, p. 600, Abstract 5349, Oct. 1986.
Patent Abstracts of Japan, vol. 11, No. 146, (M-587) [2593], May 13, 1987.

*Primary Examiner*—Patrick J. Ryan
*Assistant Examiner*—W. Krynski
*Attorney, Agent, or Firm*—Fitzpatrick, Cella, Harper & Scinto

[57] ABSTRACT

A recording medium comprises a surface layer composed mainly of aluminum oxide particles and a lower layer having ink absorptivity. A recording medium comprises a surface layer composed mainly of aluminum oxide particles and a lower layer having ink absorptivity, and having a Stöckigt sizing degree according to JIS-P-8122 of 0 to 15 sec. An ink jet recording method performs recording by imparting small droplets of an aqueous ink to a recording medium, wherein said aqueous ink contains an acidic dye and/or a direct dye, and said recording medium comprises a surface layer composed mainly of aluminum oxide particles and a lower layer having ink absorptivity. A recording medium comprises a surface layer composed mainly of aluminum oxide particles containing polyaluminum hydroxide and/or polyaluminum chloride and a lower layer having ink absorptivity. A recording medium comprises a surface layer composed mainly of aluminum oxide particles having particle sizes of 5 μm or less provided on a liquid absorptive base paper.

12 Claims, No Drawings

RECORDING MEDIUM AND INK JET RECORDING METHOD BY USE THEREOF

This application is a continuation of application Ser. No. 07/315,826 filed Feb. 24, 1989, now abandoned.

BACKGROUND OF THE INVENTION

1. Field of the Invention

This invention relates to a recording medium suitably used for the ink jet recording method, particularly to a recording medium having excellent absorptivity and color forming characteristic of an aqueous ink, as well as excellent sharpness of the recorded image obtained.

Further, the present invention relates to a recording medium which can provide a recorded image with little in-room decoloration of the image and excellent storability of the image and a recording method which can provide the above recorded image.

Further, the present invention relates to a recording medium having excellent water resistance and light resistance of the recorded image, while having various characteristics as mentioned above.

2. Related Background Art

In the prior art, as the recording medium for ink jet recording, there have been known:

(1) one obtained by making paper composed mainly of pulp into a sheet with low sizing degree like filter paper or blotting paper;

(2) one having an ink absorbina layer by the use of a porous inorganic pigment provided on a base paper with low ink absorptivity such as usual paper of fine quality, etc., as disclosed in Japanese Laid-open Patent Publication No.56-148585, etc.

On the other hand, in the ink jet recording system for which formation of a color image of high quality and high resolution is particularly demanded, the recording medium to be used is required to have the following characteristics, namely:

(1) good color forming characteristic of the ink attached on the recording medium;

(2) good true sphericity of the ink dot;

(3) good ink absorption capacity such that the ink attached will not flow out even when a plurality of ink droplets may be attached on the same spot;

(4) good ink fixability such that the ink droplets attached will not be blurred even when they may be rubbed immediately after attachment;

(5) good image storability of the image formed such as water resistance, light resistance, etc.

However, no recording medium which satisfies all of the above requisite characteristics has been known yet.

Recently, the particular problem of in-room decoloration of the recorded image inherent in coated paper has been looked at closely.

The problem of light resistance which has been recognized in the prior art is a problem of fading of the image by irradiation of, for example, UV-ray or visible light, etc., on any image printed on any kind of paper from papers for PPC in general or fine quality paper to coated papers for ink jet. However, the problem of in-room decoloration as herein mentioned is a problem separate from light resistance which occurs in the image also stored in, for example, a place where no direct sunlight is irradiated, but does not occur in the image printed on a non-coated paper such as paper for PPC, etc.

For example, the method as disclosed in Japanese Laid-open Patent Publication No. 60-49990 is a method for improving light resistance, and no effect can be seen for in-room decoloration. Thus, the problem of in-room decoloration is a Droblem inherent in coated paper, and it may be estimated to be a problem caused by the pigment forming the coated layer.

For example, the coated paper by use of highly active silica as disclosed in JaDanese Laid-open Patent Publication No. 56-185690 can give an image with high optical density, while it involves a marked problem of in-room decoloration. On the contrary, if fillers in general for paper with low specific surface area such as calcium, kaolin, talc, silica, etc. are used, although in-room decoloration may be suppressed, there is now the problem that the image density is lowered.

Thus, particularly the problems of in-room decoloration and image density are antagonistic to each other, and they have been problems not solved by the prior art technique.

SUMMARY OF THE INVENTION

Accordingly, an object of the present invention is to provide a recording medium which can give an image of high quality and high resolution which is high in density of the recorded image, and yet excellent in ink absorptivity and color forming characteristic of dye.

Another object of the present invention is to provide a recording medium which can give a recorded image with good storability, particularly a recorded image with little deterioration due to in-room decoloration and an ink jet recording method for forming such image.

Still another object of the present invention is to provide a recording medium which has excellent water resistance and light resistance of the recorded image, while having various characteristics as mentioned above.

The above and other objects of the present invention can be accomplished by the inventions as specified below.

According to the present invention, there is provided a recording medium, comprising a surface layer composed mainly of aluminum oxide particles and a lower layer having ink absorptivity.

The present invention also provides a recording medium, comprising a surface layer composed mainly of aluminum oxide particles and a lower layer having ink absorptivity, and having a Stöckigt sizing degree according to JIS-P-8122 of 0 to 15 sec.

The present invention also provides an ink jet recording method which performs recording by imparting small droplets of an aqueous ink to a recording medium, wherein said aqueous ink contains an acidic dye and/or a direct dye, and said recording medium comprises a surface layer composed mainly of aluminum oxide particles and a lower layer having ink absorptivity.

Further, the present invention provides a recording medium, comprising a surface layer composed mainly of aluminum oxide particles containing polyaluminum hydroxide and/or polyaluminum chloride and a lower layer having ink absorptivity.

The present invention further provides a recording medium, comprising a surface layer composed mainly of aluminum oxide particles with particle sizes of 5 μm or less provided on a liquid absorptive base paper.

The present inventors investigated the relationship between the pigment forming the coated layer which becomes the ink receiving layer and in-room decoloration on the basis of recognition that in-room decoloration is a phenomenon which does not occur on non-coated paper but is generated only on coated paper, and consequently found that the problem of in-room decoloration can occur with difficulty when a specific pigment is used as the pigment which forms the ink receiving layer, particularly the recording surface which captures the dye.

DESCRIPTION OF THE PREFERRED EMBODIMENTS

The present invention is described in more detail by referring to preferred embodiments.

The first suecific feature of the recording medium of the present invention resides in that the surface layer which is the recording surface is formed mainly of aluminum oxide particles.

The aluminum oxide particles as herein mentioned are produced by the method generally called the Bayer method by calcining aluminum hydroxide obtained by hot caustic soda treatment of bauxite which is a natural ore. Otherwise, particles may also be produced by the method in which metallic aluminum pellets are subjected to arc discharging in water and then the resultant aluminum hydroxide is calcined, or the method in which aluminum chloride is gasified at high temperature and oxidized in gas phase, or the method in which inorganic aluminum salt (alum, etc.) is decomposed.

The crystal structures of the aluminum oxide particles have been known to be transitioned depending on the temperature for heat treatment from aluminum hydroxide of the giftsite type, the boehmite type to aluminum oxide of $\gamma$, $\sigma$, $\eta$, $\theta$, $\alpha$ type. Of course, in the present invention, any of these preparation methods and crystal structures may be available.

The purity of aluminum oxide particles may be different depending on the preparation method, the degree of purification, but those available in the present invention are not limited to one containing 99.99% of aluminum oxide ($Al_2O_3$) generally called as high purity alumina, but those containing 80 to 90% or more of $Al_2O_3$ may be sufficiently available.

The aluminum oxide particles to be used in the present invention should preferably have a BET specific surface area within the range of from 60 to 170 $m^2/g$, more preferably from 90 to 170 $m^2/g$. If the BET specific surface area of the aluminum oxide particles exceeds 170 $m^2/g$, the in-room decoloration of the recorded image will become undesirably marked.

According to the knowledge of the present inventors, in-room decoloration of recorded image is due to oxidation decomposition of the dye, and when the dye is captured on the surface layer of the recording medium, the dye will be correspondingly susceptible to oxidation by contact with air. Particularly when the dye is captured with a pigment with large specific surface area, the contact area with air becomes the maximum, whereby the in-room decoloration is caused excessively.

Accordingly, in the present invention, it is preferable to use a pigment with a specific surface area of 170 $m^2/g$ or less.

In contrast, in the prior art, when such a pigment as silica or calcium carbonate used for ink jet recording paper having a specific surface area of 170 $m^2/g$ is used for the ink receiving layer, due to poor adsorptivity of the pigment to the dye, the dye in the ink attached is permeated deep into the paper layer together with the solvent in the ink, whereby color forming characteristic of the dye and image density were insufficient, although the problem of in-room decoloration may be solved.

This is the first reason why a pigment with a BET surface area of 170 $m^2/g$ or less has not been used in the prior art for the coated paper as described above.

Whereas, according to the knowledge of the present inventors, even a pigment with a BET specific surface area of 170 $m^2/g$ or less can give sufficient in-room decoloration inhibitina effect and also excellent image density, when aluminum oxide particles are used.

The reason why only aluminum oxide particles among various inorganic pigments can provide an image with excellent optical density as described above remains unclear, but according to the present inventors, it may be considered because aluminum oxide particles have positive charges on their surfaces and also can readily absorb electrically acidic dyes and/or direct dyes, and the paper by use of such aluminum oxide particles can capture more dyes near the surface, namely at the surface layer of the ink receiving layer, and also because the dyes and the aluminum oxide particles are electrically bonded, and therefore the dyes existing near the surface layer are stabilized to be decomposed with difficulty, etc.

On the other hand, when aluminum oxide particles not satisfying a BET specific surface area of 60 $m^2/g$ or more are used, the density of the image formed becomes insufficient and therefore it is desirable to use those having a BET specific surface area of 60 $m^2/g$ or more.

According to the knowledge of the present inventors, when silica is used as the pigment forming the recording surface (surface layer), since the relationships between the specific surface area of silica and image density and between the specific surface area and in-room decoloration are strong, prevention of in-room decoloration and improvement of image density cannot be compatible with each other, whereby it has been difficult to improve the both at the same time.

Thus, the tendency of the both characteristics to be antagonistic to each other may be similar also in the case of aluminum oxide particles as silica, but when aluminum oxide particles are used, the elevating tendency of image density relative to the specific surface area of the pigment is more marked than silica, having the advantage that a desired image density can be achieved with partices having lower specific surface area (170 $m^2/g$ or less) as compared with silica. This is the reason why both prevention of in-room decoloration and improvement of image density can be improved by the present invention.

The aluminum oxide particles to be used in the present invention have an average particle size preferably of 5 $\mu m$ or less, more preferably 3 $\mu m$ or less, further preferably 1 $\mu m$ or less.

Thus, by use of the aluminum oxide particles having the specific surface area as specified above, the image density and the in-room storability can be improved to a considerable extent, but yet the image density and the in-room storability have the trade-off relationship.

In other words, according to the knowledge of the present inventors, to have excellent in-room storability, while retaining high image density, it is preferable to use the above aluminum oxide particles, having an average particle size of 5 $\mu m$ or less, more preferably 3 $\mu m$ or less, further preferably 1 $\mu m$ or less.

An average particle size exceeding 5 μm is insufficient for inhibiting in-room decoloration. The average particle size as herein mentioned is the particle size under the state where the ink receiving layer is formed. Generally speaking, since the primary particle size of aluminum oxide particle is about 1 nm to 1 μm, particles forming no secondary particle are preferred in the present invention. Further, in the aspect of ink absorptivity, the average primary particle size of aluminum oxide particles should be preferably 0.5 μm or less. Those exceeding 0.5 μm have insufficient ink absorptivity.

Also, according to the knowledge of the present inventors, although the correlation between the particle size of the aluminum oxide particles and the image density is low, in-room storability becomes better as the particle size is smaller.

This may be due to the fact that the apparent surface area on the recording surface is larger when a pigment with larger particle sizes is used during formation of the recording surface as compared when particles with smaller particles are laminated, whereby the dye adsorbed is susceptible to oxidation.

In the recording medium of the prior art, for improving ink absorptivity, secondary particles are formed, and a pigment with such large particle size has been employed. In the present invention, there is no problem in ink absorptivity even by formation of a surface layer with particles of submicron order without formation of secondary particles, because of the special constitution of the ink receiving layer as described below.

The second specific feature of the present invention resides in that the recording medium of the present invention is constituted of a surface layer containing the above aluminum oxide particles and a lower layer having ink absorptivity.

The surface layer as herein mentioned is a layer constituting the recording surface, and cannot itself absorb and retain all the ink amount attached, but has the function of adsorbing primarily the dye in the ink and permeates most of the ink solvent to migrate it to the ink absorptive lower layer.

For this reason, the recording medium of the present invention includes the embodiment of having a recording surface in which the pigment forming the surface layer and the fibrous material of base paper exist in mixture and/or the embodiment of having a recording surface covered with a surface layer with the maximum thickness of 20 μm, more preferably 15 μm or less.

A preferable amount of the surface layer coated as herein mentioned may be within the range of from 0.3 to 7 $g/m^2$ as the total amount of the pigment. When the coated amount is less than 0.3 $g/m^2$,there is no effect as compared with the case when no surface layer is provided, while if it is provided in excess of 7 $g/m^2$ or the maximum thickness of the surface layer exceeds 20 μm, similarly as in the case of the above recording medium (2), there ensue such problems as remarkable lowering in ink absorptivity, lowering in in-room decoloration prevention or generation of paper powder even when the above aluminum oxide particles may be used.

In the present invention, a more preferable amount of the pigment coated on the surface layer is within the range of from 1 to 7 $g/m^2$, further preferably from 2 to 7 $g/m^2$.

The maximum thickness of the surface laver as herein mentioned refers to the maximum value in the depth direction of the surface layer in the cross-section of the recording medium, and the amount of the pigment coated is the amount of the pigment coated as the surface layer. The amount of the pigment coated in the surface layer is determined according to the method of JIS-P-8128, and can be obtained as the value of the amount of the ash in the whole recording medium from which the amount of ash in the base paper is removed.

In the present invention, the surface layer is formed mainly of the above aluminum oxide particles, but may also use inorganic pigments known in the art, such as silica, aluminum silicate, magnesium silicate, calcium silicate, calcium carbonate, clay, kaolin, talc, diatomaceous earth, etc., or organic pigments such as urea resin, etc. mixed in the pigment in an amount within the range which does not exceed 20% by weight.

The pigment for forming the surface layer as described above should desirably contain 80% by weight or more of aluminum oxide particles, and when aluminum oxide particles are contained in an amount less than 80% by weight, the image density will be lowered, and the problem of in-room storability may not be cancelled depending on the kind of the pigment used in combination.

As described above, in the recording medium of the present invention, a recording medium which can satisfy the respective requisite performances can be obtained by providing a relatively minute amount of the surface layer, because it is used in combination with an ink absorptive lower layer as described below.

The present invention, as shown above, is distinct in its constitutional aspect from, for example, a prior art example comprising an ink receiving layer in an amount as much as 15 $g/m^2$ with the use of aluminum particles having a particle size of 30 μm on a polyethyleneterephthalate film as shown in Example 2 in Japanese Laid-open Patent Publication No. 58-110287 or an example comprising aluminum particles filled internally in pulp fibers during sheet making as disclosed in Japanese Laid-open Patent Publication No. 58-110288.

Specific examples of preferable recording medium having ink absorptive lower layer in the present invention may include:

(1) the embodiment in which a surface layer is provided on an liquid absorptive base paper, and the base paper also functions as the ink absorptive lower layer; and (2) the embodiment in which a pigment layer with excellent ink absorptivity is provided on a base paper, on which a surface layer is provided, etc.

In the following, the respective embodiments are to be described in detail.

The embodiment (1) is the most preferred embodiment in the present invention in aspect of the problems of in-room decoloration, paper powder, etc., stability in production or cost.

The surface layer of this embodiment is constituted of a pigment containing the above aluminum oxide particles and a binder. Examples of the binder to be used in the present invention may include water-soluble polymers such as polyvinyl alcohol, starch, oxidized starch, cationized starch, casein, carboxymethyl cellulose, gelatin, hydroxyethyl cellulose, acrylic resin, etc. and aqueous dispersion type polymers such as SBR latex, polyvinyl acetate emulsion, etc. known in the art, which can be used either singly or as a mixture of two or more kinds.

In this embodiment, a preferable use ratio (weight ratio) of all the pigments to the binder may be ½ to 20/1, more preferably ½ to 4/1. If the binder amount is more than ⅓, the ink absorptivity possessed by the coated layer is lowered, while if it is lower than 20/1, powder drop-off of the above pigment from the coated layer becomes undesirably excessive.

The base paper on which the above surface layer is provided is required to be ink absorptive, having a preferable Stöckigt sizing degree within the range from 0 to 15 sec., more preferably from 0 to 10 sec., further preferably from 0 to 8 sec. When a base paper having a Stöckigt sizing degree in excess of 15 is used, the ink absorptivity of the recording medium as a whole is undesirably deficient.

The recording medium having the above coated layer provided on the base paper should desirably have a Stöckigt sizing degree within the range from 0 to 15 sec., more preferably from 0 to 10 sec., further preferably from 0 to 5 sec. If it exceeds 15 sec., most of ink absorptivity depends on the coated layer within the above range, whereby ink absorptivity will be deficient.

In the present invention, the pulp constituting the base paper is not particularly limited, but it may be composed mainly of wood pulp as represented by LBKP or NPKP known in the art, but synthetic fibers or glass fibers may be also mixed therein, if desired.

Specific examples of the fillers in the base paper to be used in the present invention may include clay, talc, kaolinite, titanium oxide, calcium carbonate, etc., and particularly in the present invention, these fillers are contained in an amount of 1 to 20 $g/m^2$, more preferably 2 to 10 $g/m^2$ as calculated on the ash content.

According to the knowledge of the present inventors, particularly blurring and dot shapes of ink droplets attached on the recording medium are greatly affected by the ash content in the base paper of this type of paper, and when the ash content is less than 1 $g/m^2$, the ink droplets attached will be blurred greatly along the fiber direction on the base paper surface, whereby the dot shapes are bad and also blurring of the ink droulets will become larger than is necessary. On the contrary, if it exceeds 20 $g/m^2$ the recording medium itself will lose firmness, and in addition thereto, powder drop-off from the base paoer will occur undesirably.

Further, of the above fillers, calcium carbonate is particularly preferable, because it improves the dot shape and the color forming characteristic The ash content in the base paper in the above embodiment (1) can be determined by, for example, eliminating the ink receiving layer from the recordina medium by use of a good solvent for the binder and determining only the ash content in the base paper according to the method of JIS-P-8128, as the mass of the ash content per unit area of the paper at that time. For example, in conventional paper for ink jet, polyvinyl alcohol is used as the binder, and in this case, the coated layer is eliminated by dipping the recording medium in stationary hot water, and then the ash content as the base paper can be determined.

The base paper to be used in the above embodiment (1) can be made with the use of the above materials optionally together with sheet making aids, sizing agents, yield enhancers, paper force strengthening agents, etc. known in the art, if desired.

Also, a preferable basis weight of the base paper to be used in the embodiment (1) may be within the range of from 60 to 120 $g/m^2$. Thus, since the recording medium of the embodiment (1) absorbs ink through the base paper, if the basis weight of the base paper is less than 60 $g/m^2$, there may ensue problems such as generation of strike-through or cockling, etc. when high density printing is performed. On the contrary, if it exceeds 120 $g/m^2$, the paper becomes too firm, whereby a problem of conveyability within the recording device arises.

The recording medium of the embodiment (2) absorbs ink only with the pigment layer, and therefore is excellent in ink absorptivity and dot shape, thus being suitable for providing images of high resolution and high quality.

The specific feature of the recording medium of the embodiment (2) resides in that the ink receiving layer comprises a layer constitution of two or more layers and contains an ink holding layer formed primarily of a pigment with larger particle size than the above aluminum oxide particles.

The ink holding layer is preferably formed mainly of a pigment having an (average) particle size of 5 to 30 μm, more preferably a silicon containing type pigment, further preferably a synthetic silica, and is arranged lower than the layer containing the aluminum oxide particles constituting the recording surface as described above.

In the above embodiment (2), by use of a pigment with larger particle sizes as the ink holding layer and embedding the small unevennesses on the surface with a pigment with smaller particle sizes of the layer constituting the recording surface, images with further better dot shape and without coarseness can be obtained without occurrence of powder drop-off, while utilizing the advantage of using a pigment with larae particle sizes.

The specific surface area of the pigment forming the ink holding layer should be preferably larger than the pigment forming primarily the surface layer, more preferably 200 $m^2/g$ or higher, also in the regard to ink absorptivity. Also, in aspect of color forming characteristic and ink absorptivity, a constitution with the ink absorption speed of the surface layer which is slow to the extent that ink droplets may be blurred in appropriate sizes and with the ink absorptivity of the ink holding layer being large is preferable. For this purpose, the use ratio of the pigment to the binder in the surface layer constituting the recording surface may be preferably ⅓ to 5/1, more preferably ½ to 3/1, preferably 1/1 to 10/1 as the total of the ink receiving layer. Also, any of the binders known in the art can be used for formation of the ink holding layer. The amount of the total ink receiving layer coated may be preferably within the range of from 2 to 50 $g/m^2$, more preferably from 8 to 30 $g/m^2$, with the coated amount of the ink holding layer being preferably larger than that of the surface layer.

Further, for making the ink absorptivity of the recording medium of the embodiment (2) better, preferably as the pigment forming the ink holding layer, porous silica particles having spherical particle shapes as disclosed in Japanese Laid-open Patent Publication No. 62-183382 can be used. Particularly, when the above spherical silica having an average particle size of 5 to 30 μm is used for the ink holding layer, an ink receiving layer with higher void volume as compared with that by use of amorphous pigment of the prior art can be formed, whereby a recording medium having excellent ink absorptivity can be provided.

In preparing the recording medium of the present invention according to the respective embodiments as described above, a coating solution containing the components as described above is coated on the substrate surface according to the method known in the art, such as the roll coater method, the blade coater method, the air knife coater method, the gate roll coater method, the size press method, etc. Also, after an aqueous coating solution comprising a pigment and a binder is coated on the substrate, the coating can be dried according to the method known in the art by using, for example, hot air drying furnace, hot drum, etc. to give the recording medium of the present invention.

Also, for making the ink receiving layer surface smooth, or enhancing the surface strength of the ink receiving layer, a super calender may be used in the steps.

The recording medium of the present invention formed as described above has high image density and excellent ink absorptivity, yet excellent characteristics without occurrence of in-room decoloration.

For improving further water resistance and light resistance of the recorded image, while retaining the above various recording characteristics, it is necessary to incorporate a polyaluminum hydroxide and/or a polyaluminum chloride in the pigment layer containing the aluminum oxide particles.

The polyaluminum hydroxide as herein mentioned is a compound having two or more compounds represented by $[Al(OH)_{3-a}]$ in the molecule, including, for example, compounds represented by:

$$[Al(OH)_3]_nAlCl_3 \ (n \geqq 2),$$

and the above compounds are commercially available under the trade name of paho#2S from Asada Kagaku Kogyo.

The polyaluminum chloride is a compound having two or more compounds represented by $(AlCl_{3-b}]$ in the molecule, including, for example, compounds represented by the formula:

$$[Al_2(OH)_1Cl_{6-1}]_m \ (m \geqq 1),$$

and the compounds are commercially available under the trade name of PAC from Taki Kagaku Kogyo.

The recording medium of the present invention should preferably contain these compounds in an amount within the range of from 0.01 g/m$^2$ to 5 g/m$^2$. If it is less than 0.01 g/m$^2$, water resistance is insufficient, while if it is contained in excess of 5 g/m$^2$, there are problems such as lowering the ink absorptivity and image density.

In the prior art, as the dye fixing agent available in recording medium for ink jet, there may be included those disclosed in Japanese Laid-open Patent Publications Nos. 56-84992, 59-20696, 59-33176, 60-11389, 61-58788, 61-252189, etc., all of which are of the amine type, but cannot sufficiently satisfy both water resistance and light resistance, although improved.

The recording medium of the present invention, which uses an aluminum type compound different from the amine type as in the prior art as the dye fixing agent, has the effect of improving water resistance of the dye, and has no deleterious effect on light resistance.

Further, although the polyaluminum compound can be used with an amine type dye fixing agent as described above mixed therein, the amine type water resistant agent in this case should be preferably within the range of 70% by weight or less, more preferably 25% by weight or less, of the polyaluminum compound. If it is contained in excess of 70%, the bad influence by use of the amine type water resistance-affording agent will appear to lower undesirably light resistance.

In the present invention, the ink receiving layer may also contain fluorescent brighteners, surfactants, defoaming agents, pH controllers, antifungal agents, UV-absorbers, antioxidants, etc., if necessary.

By use of the ink jet recording system for the recording medium of the present invention with a constitution as described above, for example, according to the recording method of the present invention which performs recording with a multi-color aqueous ink such as yellow (Y), magenta (M), cyan (C), black (Bk), etc., no in-room decoloration occurs on the image obtained to give a recorded imaae with excellent storability.

The method of the present invention is a recording method by use of the recording medium of the present invention as described above, and the ink itself which is imparted by the ink jet recording method to the specific recording medium as described above in the recording method may be also known. For example, its recording agent may be water soluble dyes as represented by direct dyes, acidic dyes, basic dyes, reactive dyes, dyes for foods, etc. Preferable examples of the dyes particularly suitable for the ink in the ink jet recording system, which can give images satisfying requisite performances in combination with the above recording medium such as color forming characteristic, sharpness, stability, light resistance and others may include:

Direct dyes such as
C.I. Direct Black 17, 19, 32, 51, 71, 108, 146,
C.I. Direct Blue 6, 22, 25, 71, 86, 90, 106, 199,
C.I. Direct Red 1, 4, 17, 28, 83,
C.I. Direct Yellow 12, 24, 26, 86, 98, 142,
C.I. Direct Orange 34, 39, 44, 46, 60,
C.I. Direct Violet 47, 48,
C.I. Direct Brown 109,
C.I. Direct Green 59, etc.;
Acidic dyes such as
C.I. Acid Black 2, 7, 24, 26, 31, 52, 63, 112, 118,
C.I. Acid Blue 9, 22, 40, 59, 93, 102, 104, 113, 117, 120, 167, 229, 234,
C.I. Acid Red 1, 6, 32, 37, 51, 52, 80, 85, 87, 92, 94, 115, 180, 256, 317, 315,
C.I. Acid Yellow 11, 17, 23, 25, 29, 42, 61, 71,
C.I. Acid Orange 7, 19,
C.I. Acid Violet 49, etc.;
and, otherwise,
C.I. Basic Black 2,
C.I. Basic Blue 1, 3, 5, 7, 9, 24, 25, 26, 28, 29,
C.I. Basic Red 1, 2, 9, 12, 13, 14, 37,
C.I. Basic Violet 7, 14, 27,
C.I. Food Black 1, 2, etc.
can be also used.

The above examples of dyes set forth are particularly preferred for the ink applicable to the recording method of the present invention, and the dyes for the ink to be used in the present invention are not limited to these dyes.

Such water soluble dyes are used generally in the ink of the prior art at a ratio about 0.1 to 20% by weight of the ink, and the same ratio may be used also in the present invention.

The solvent to be used for the aqueous ink to be used in the present invention is water or a solvent mixture of water with a water soluble organic solvent, particularly preferably a solvent mixture of water and a water soluble organic solvent. As the water soluble organic solvent, one containing a polyhydric alcohol having a drying prevention effect on ink is preferred. As the water, it is preferable to use deionized water instead of water in general containing various ions.

The content of the water soluble organic solvent in the ink may be generally within the range from 0 to 95% by weight, preferably from 2 to 80% by weight, more preferably from 5 to 50% by weight.

A preferable water content may be 20 to 98%, more preferably 50 to 90%, based on the total weight of the ink.

The ink to be used in the present invention can also include surfactants, viscosity controllers, surface tension controllers, etc., if desired, in addition to the above components.

The method for performing recording by imparting the above ink to the above recording medium in the method of the present invention may be any recording method, but preferably the ink jet recording method, and said method may be any system, provided that it is a system capable of eliminating effectively the ink from the nozzle and imparting the ink to the recording medium which is the target of injection.

Particularly, the ink jet system which discharges ink through the nozzle by the acting force due to the state change by the abrupt volume change of ink having received the action of heat energy according to the method disclosed in Japanese Laid-open Patent Publication No. 54-59936 can be effectively used.

The recording medium of the present invention as described above is suitable as the recording medium for ink jet recording, particularly by use of aqueous ink, and exhibits the following effects.

(1) Since it is highly absorptive of aqueous ink, it becomes substantially the same state as dried immediately after imparting of ink, and a part of the recording device. Hands or fingers when contacted with the medium will not be contaminated, and the recorded image will not be contaminated.

(2) When used for ink jet recording, in addition to the above effect (1), the dot has high density with a shape approximate to true sphere, without excessive blurring of dot or occurrence of feathering from dot, whereby a sharp image with high resolution can be formed.

(3) Since it has excellent color characteristics, it is suitable for color printer.

(4) There is little problem of image storability inherent in coated paper and, in the ink jet recording method by use of the recording medium of the present invention and a multi-color ink, there occurs no problem of in-room decoloration which has occurred when the image obtained is stored on the wall or in the drawer in an office where no direct sunlight is irradiated for one to several months.

(5) The recording medium of the present invention, while possessing the above characteristics (1) to (4), is also excellent in water resistance and light resistance of the recorded image.

The present invention is described in more detail below by referring to Examples and Comparative examples, in which parts and percentages are based on weight unless otherwise noted.

EXAMPLES 1 TO 4

By use of a substrate having a Stöckigt sizing degree of 5 sec., a basis weight of 66 $g/m^2$ and containing calcium carbonate in an amount of 9.0% (5.9 $g/m^2$) as calculated on ash content according to JIS-P-8128, a coating solution having the composition shown below was coated according to the bar coater method to a coated amount on drying of 5 $g/m^2$ and dried at 110° C. for 3 minutes to obtain a recording medium of the present invention.

| Coating solution composition | |
|---|---|
| Pigment | 24 parts |
| Polyvinyl alcohol (PVA-117, produced by Kuraray) | 8 parts |
| Polyvinyl alcohol (PVA-105, produced by Kuraray) | 4 parts |
| Water | 200 parts |

The pigments used are shown below in Table 1.

COMPARATIVE EXAMPLE 1

A recording medium was prepared in the same manner as in Example 1 except for using a paper for PPC having a Stöckigt sizing degree of 24 sec. and a basis weight of 66 $g/m^2$ (paper for Canon NP dry) as the base paper.

EXAMPLES 5 TO 8 AND COMPARATIVE EXAMPLES 2 AND 3

By use of a paper having a Stöckigt sizing degree of 0 sec., a basis weight of 65 $g/m^2$ and calcium carbonate in an amount of 2.4% (1.6 $g/m^2$) as calculated on ash content in the base paper, a coating solution with the same composition as in Example 1 was coated by the bar coating method to a coated amount on drying of 7 $g/m^2$ and dried at 110° C. to obtain the recording media of the present invention and Comparative example.

As the pigments, the mixtures of alumina with other pigments as shown in Table 2 were used.

TABLE 1

| | I | II | III | IV | V | VI |
|---|---|---|---|---|---|---|
| Example 1 | Alumina AKP-G (Sumitomo Kagaku) | 0.05 | 0.05 | 136 | 3.6 | 5 |
| Example 2 | Aerosil aluminum oxide-C (Degussa) | 0.02 | 0.02 | 100 | 3.4 | 5 |
| Example 3 | Alumina UA-5605 (Showa Denko) | 1.8 | 0.05 | 64 | 3.5 | 5 |
| Example 4 | Alumina CAH-G (Sumitomo Kagaku) | 4.1 | 0.1 | 115 | 3.5 | 5 |
| Comparative example 1 | Alumina AKP-G | 0.05 | 0.05 | 136 | 3.4 | 24 |

Remarks
I Kind of particles (manufacturer)
II Average particle size (μm)
III Average primary particle size (μm)
IV BET specific surface area ($m^2/g$)
V Amount of pigment coated ($g/m^2$)
VI Sizing degree of recording medium (sec)

TABLE 2

| | I | II | III | IV |
|---|---|---|---|---|
| Example 5 | 24 parts | 0 parts | 4.8 ($g/m^2$) | 1 (sec) |
| Example 6 | 20 | 4 | 4.8 | 1 |
| Comparative example 2 | 0 | 24 | 4.5 | 1 |

Remarks
I Alumina (AKP-G, Sumitomo Kagaku)
II Zinc oxide (active zinc white AZO, produced by Seido Kagaku, Particle size 0.8 μm, specific surface area 64 $m^2/g$)
III Amount of pigment coated ($g/m^2$)
IV Sizing degree of recording medium (sec)

| | | | | |
|---|---|---|---|---|
| Example 7 | 24 parts | 0 parts | 4.6 ($g/m^2$) | 2 (sec) |

TABLE 2-continued

| | I | II | III | IV |
|---|---|---|---|---|
| Example 8 | 20 | 4 | 4.6 | 2 |
| Comparative example 3 | 0 | 24 | 4.8 | 1 |

Remarks
I Aerosil aluminum oxide-C (Degussa)
II Finesil X-37 (Tokuyama soda, Particle size 2.7 μm, Specific surface area 260 $m^2/g$)
III Amount of pigment coated ($g/m^2$)
IV Sizing degree of recording medium (sec)

The ink jet recording adaptability of the above recording medium was evaluated by performing the ink jet recording with an ink having the composition shown below by means of an ink jet printer having ink jet heads equipped with 128 nozzles with nozzle interval of 1 mm/16 nozzles corresponding to the four colors of Y, M, C and Bk.

| Ink Composition | |
|---|---|
| Dye | 5 parts |
| Diethylene glycol | 20 parts |
| Water | 78 parts |
| Dye | |
| Y: C.I. Direct Yellow 86 | |
| M: C.I. Acid Red 35 | |
| C: C.I. Direct Blue 199 | |
| Bk: C.I. Food Black 2 | |

Evaluation was conducted for the items shown below. The results are shown below in Table 3.

(1) Ink absorptivity was evaluated by means of the ink jet printer as described above. Sharp printed image without color mixing at the printing boundary between the printed letters printed with the respective colors of Y, M, C and Bk was evaluated as O, and one which is not so as x.

(2) For image density, the image density of a printed matter (BK) of solid printing by means of the same ink jet printer was evaluated by use of a Macbeth reflection densitometer RD-918.

(3) Storability in room was measured by leaving the printed matter used in the above (2) (Bk) plastered on the wall in an office to stand for 6 months. The difference $\Delta E^*ab$ between the chromaticity of the image immediately after printing (before standing) and the chromaticity of the image after standing was determined for evaluation of storability in room.

(4) For paper powder, when the ink receiving layer surface is scratched with a pencil with a hardness of H, one with much generation of paper powder by peel-off or cutting of the coated layer is evaluated as x, and good one as 0.

TABLE 3

| | Ink Absorptivity | Image Density | In-room storability ($\Delta E^*ab$) | Paper Powder |
|---|---|---|---|---|
| Example 1 | O | 1.65 | 4.5 | O |
| Example 2 | O | 1.48 | 2.5 | O |
| Example 3 | O | 1.36 | 9.4 | O |
| Example 4 | O | 1.56 | 11.9 | O |
| Comparative Example 1 | X | 1.30 | 5.6 | O |
| Example 5 | O | 1.58 | 5.2 | O |
| Example 6 | O | 1.48 | 4.6 | O |
| Comparative Example 2 | X | 1.16 | 2.1 | O |
| Example 7 | O | 1.42 | 3.2 | O |
| Example 8 | O | 1.47 | 6.8 | O |
| Comparative Example 3 | O | 1.57 | 25.4 | O |

EXAMPLES 9 TO 11 AND COMPARATIVE EXAMPLES 4 AND 5

By use of a usual paper of fine quality (Ginkan, trade name, manufactured by Sanyo Kokusaku Pulp) as the substrate, it was coated with a coating solution I shown below to a coated amount on drying of 20 $g/m^2$ by the bar coater method and dried at 110° C. for 5 minutes to form an ink holding layer, and on the ink holding layer was coated a coating solution II shown below to a coated amount on drying of 7 $g/m^2$ by the bar coater method, followed by drying at 110° C. for 3 minutes, to form a surface layer to prepare recording media of the present invention and Comparative example.

| Composition of coating solution I | |
|---|---|
| Synthetic silica (spherical silica, BET specific surface area 700 $m^2/g$, average particle size 200 μm, produced by Asahi Glass) | 18 parts |
| Polyvinyl alcohol (PVA-117/R-1130, produced Kuraray) | 6 parts |
| Water | 76 parts |

| Composition of coating solution II | |
|---|---|
| Example 9 | |
| Porous alumina (RG-40, produced by Iwatani Kagaku Kogyo specific surface area 48 $m^2/g$) | 13 parts |
| Polyvinyl alcohol (PVA-110, produced by Kuraray) | 10 parts |
| Water | 77 parts |
| Example 10 | |
| Fine particulate alumina (Aerosil, aluminum oxide-C, produced by Nihon Aerosil, BET specific surface area 100 $m^2/g$) | 13 parts |
| Polyvinyl alcohol (PVA-110, produced by Kuraray) | 10 parts |
| Water | 77 parts |
| Example 11 | |
| High purity alumina (AKP-G, produced by Sumitomo Kagaku, BET specific surface area 130 $m^2/g$) | 13 parts |
| Polyvinyl alcohol (PVA-110, produced by Kuraray) | 10 parts |
| Water | 77 parts |
| Comparative example 4 | |
| Fine powder silica (Syloid 74, produced by Fujidevison, BET specific surface area 300 $m^2/g$) | 13 parts |
| Polyvinyl alcohol (PVA-110, produced by Kuraray) | 10 parts |
| Water | 77 parts |
| Comparative example 5 | |
| Zinc oxide (active zinc white AZO, produced by Seido Kagaku BET specific surface area 64 $m^2/g$) | 13 parts |
| Polyvinyl alcohol (PVA-110, produced by Kuraray) | 10 parts |
| Water | 77 parts |

EXAMPLE 12

On the same base paper as in Example 9, by use of a coating solution III shown below, it was coated by the bar coater method to a coated amount on drying 20 $g/m^2$, followed by drying at 110° C. for 5 minutes, to form an ink holding layer, and on the ink holding layer was coated a coating solution IV shown below to a coated amount on drying of 7 $g/m^2$, followed by drying at 110° C. for 3 minutes to form a surface layer, thus providing a recording medium of the present invention.

| Composition of coating solution III | |
|---|---|
| Synthetic silica (Syloid 620, BET specific surface area 300 $m^2/g$ average particle size 12 μm, produced by Fujidevison) | 20 parts |
| Polyvinyl alcohol (PVA-117, produced by Kuraray) | 5 parts |
| Water | 75 parts |

| Composition of coating solution IV | |
|---|---|
| γ-alumina (UA-5605, produced by Showa Denko, BET specific surface area 64 $m^2/g$) | 12 parts |
| Polyvinyl alcohol (PVA-110, produced by Kuraray) | 11 parts |
| Water | 77 parts |

COMPARATIVE EXAMPLE 6

On the same base paper as used in Example 10 was coated a coating solution shown below by the bar coater method to a coated amount of 15 $g/m^2$, followed by drying at 140° C. for 5 minutes to form a lower layer with low ink absorptivity. On the lower layer was applied coating by use of the coating solution used in Example 10 in the same manner as in Example 10, followed by drying, to obtain a recording medium 6 for comparison.

| Composition of coating solution | |
|---|---|
| Polyvinyl pyrrolidone (PVP K-90, produced by GAF) | 9 parts |
| Isobutylene/Maleic anhydride copolymer (Isovan 10, produced by Kuraray Isoprene Chemical) | 3 parts |
| Dimethyl formamide | 88 parts |

The evaluation for the respective recording media of the above Examples 9 to 12 and Comparative examples 4 to 6 was conducted for the following items. The results are shown below in Table 4.

(1) Ink absorptivity was evaluated by means of the above ink jet printer. The recorded image with excessive line boldness at the mixed color portion of two colors than at the single color portion and generation of ink flow-out is evaluated as x, one without line boldness as ○, one with slight generation as Δ. Further, one without line boldness even at the overlapped portion of three colors as ◎.

(2) Storability in room is measured by printing a solid pattern of Bk by use of the above printer, and leaving the printed product to stand for six months plastered on the wall in an office. The difference between the chromaticity of the image and the chromaticity of the image immediately after printing (ΔE*ab) is determined for evaluation of decoloration in room.

(3) For the color characteristic, the chromaticity of the printed products by solid printing (Y,M,C) by use of the above printer was measured by use of a high speed color analyzer (produced by Murakami Shikisai Kagaku).

(4) For the image density, O.D. of the printed product by solid printing (Bk) by use of the above printer was measured by use of Macbeth densitometer RD-914.

| | I | II | III | | | IV |
|---|---|---|---|---|---|---|
| | | | Y | M | C | |
| Example 9 | ◎ | 7.3 | 77.8 | 67.9 | 50.0 | 1.26 |
| Example 10 | ◎ | 13.3 | 83.3 | 71.9 | 53.2 | 1.55 |
| Example 11 | ◎ | 14.5 | 82.4 | 72.2 | 54.1 | 1.66 |
| Example 12 | ○ | 8.6 | 78.1 | 69.2 | 50.8 | 1.37 |
| Comparative Example 4 | ◎ | 34.8 | 82.3 | 72.0 | 52.1 | 1.63 |
| Comparative Example 5 | ◎ | 5.4 | 61.9 | 53.7 | 46.3 | 1.18 |
| Comparative Example 6 | X | 9.4 | 83.4 | 72.1 | 53.5 | 1.42 |

Note:
I: Ink absorptivity
II: In-room storability (ΔE*ab)
III: Color characteristic
IV: Image density (Bk)

EXAMPLES 13-16 AND COMPARATIVE EXAMPLES 7-9

Except for using the coating compositions shown below (Table 5), recording media were prepared in the same manner as in Example 1.

| Composition of coating solution | |
|---|---|
| Pigment | 20 parts |
| Polyvinyl alcohol (PVA-110, produced by Kuraray) | 10 parts |
| Water-resistant agent | 3.6 parts |
| Water | 266 parts |

TABLE 5

| | Pigment | Dye fixing agent |
|---|---|---|
| Example 13 | Alumina (AKPOG) | Polyaluminum hydroxide (paho#2S, manufactured by Asada Kagaku Kogyo) |
| 14 | Alumina (Aerosil aluminum oxide-C) | Polyaluminum chloride (PAC 250A, manufactured by Taki Kagaku Kogyo) |
| 15 | Alumina (AKP-G) | Polyaluminum hydroxide (paho#2S) 2.7 parts Polyamide epichlorohydrin (Polyfix 601, produced by Showa Kobunshi) 0.9 part |
| 16 | Alumina (Aerosil aluminum oxide-C) | Polyaluminum chloride (PAC 250A) 2.7 parts Polyallylamine (PAA-10S, manufactured by Nittobo) 0.9 parts |
| Reference example 1 | Alumina (AKP-G) | None, amount of water is made 270 parts |
| Comparative example 7 | Ultra-fine silica particles (Finesil X-37) | Polyaluminum hydroxide (paho#2S) |
| 8 | Alumina (AKP-G) | Polyamide epichloro-hydrin resin (Polyfix 601) |
| 9 | Alumina (AKP-G) | Polyallylamine (PAA-10S) |

By use of the above recording media, recording was performed evaluated in the same manner as in Example 1. The results are shown in Table 6.

Water resistance and light resistance were evaluated as described below.

Water resistance was evaluated by dipping the printed product of (1) in running water (20° C.) for 5 minutes, and determining the ratio of the image density at the M printed portion after dipping relative to the image density before dipping (residual O.D. ratio).

Light resistance was evaluated by irradiating the printed product of (1) by use of Xenon Fade-Ometer (manufactured by Ci-35 Atlas Co.) under the conditions of a black panel temperature of 63° C. and a humidity of 70% RH for 100 hours, and determining the ratio of the image density at the M printed portion after irradiation relative to the image density before irradiation.

TABLE 6

| | Ink absorp-tivity | Image density | Water resis-tance | Light resis-tance | In-room storability ($\Delta E^*ab$) |
|---|---|---|---|---|---|
| Example 13 | o | 1.60 | 95% | 83% | 3.4 |
| 14 | o | 1.48 | 94% | 78% | 2.3 |
| 15 | o | 1.59 | 98% | 80% | 3.2 |
| 16 | o | 1.48 | 99% | 74% | 2.1 |
| Reference Example 1 | o | 1.62 | 72% | 88% | 4.4 |
| Comparative Example 7 | o | 1.63 | 80% | 76% | 26.3 |
| 8 | o | 1.59 | 102% | 43% | 3.1 |
| 9 | o | 1.48 | 99% | 38% | 1.9 |

We claim:

1. A recording medium comprising:

a surface layer composed mainly of aluminum oxide particles, said surface layer coated within the range of 0.3 to 7 $gm/m^2$ as the total amount of the pigments, said particles having a BET surface area within the range of 60 to 170 $m^2/g$, and having an average particle size of 5 $\mu m$ or less, and a lower layer having ink absorptivity, said lower layer being formed of paper that includes fibrous material, and has an ash content of 1 to 20 $g/m^2$, and has a Stöckigt sizing degree according to JIS-P-8122 of 0 to 15 seconds, wherein the surface layer is in a mixture of aluminum oxide particles with the paper fibrous material of the lower layer.

2. A recording medium according to claim 1, wherein the aluminum oxide particles have an average particle size of 1 $\mu m$ or less.

3. A recording medium according to claim 1, wherein the aluminum oxide particles comprise not less than 80% by weight of all the pigments in the surface layer.

4. An ink jet recording method comprising the step of:

performing recording by imparting small droplets of an aqueous ink to a recording medium, wherein said aqueous ink contains at least one of an acidic dye and a direct dye, and said recording medium comprises:

a surface layer composed mainly of aluminum oxide particles, said surface layer coated within the range of 0.3 to 7 $g/m^2$ as the total amount of the pigments, said particles having a BET surface area within the range of 60 to 170 $m^2/g$, and having an average particle size of 5 $\mu m$ or less, a lower layer having ink absorptivity, said lower layer being formed of paper that includes fibrous material, and has an ash content of 1 to 20 $g/m^2$, wherein the surface layer is in a mixture of aluminum oxide particles with the paper fibrous material of the lower layer, and said recording medium further having a Stöckigt sizing degree according to JIS-P-8122 of 0 to 15 seconds.

5. An ink jet recording method according to claim 4, wherein said small droplets of the ink are formed by permitting heat energy to act on the ink.

6. A recording medium, comprising:

a surface layer composed mainly of aluminum oxide particles, said surface layer coated within the range of 0.3 to 7 $g/m^2$ as the total amount of the pigments, said surface layer further containing at least one of polyaluminum hydroxide and polyaluminum chloride, said aluminum oxide particles having a BET surface area within the range of 60 to 170 $m^2/g$, and having an average particle size of 5 $\mu m$ or less, a lower layer having ink absorptivity, said lower layer being formed of paper that includes fibrous material, and has an ash content of 1 to 20 $g/m^2$, and wherein the surface layer is in a mixture of aluminum oxide particles with the paper fibrous material of the lower layer, and said recording medium further having a Stöckigt sizing degree according to JIS-P-8122 of 0 to 15 seconds.

7. A recording medium according to claim 6, wherein the aluminum oxide particles have an average particle size of 1 $\mu m$ or less.

8. A recording medium according to claim 6, wherein the aluminum oxide particles comprise not less than 80% by weight of all the pigments in the surface layer.

9. A recording medium according to claim 6, wherein said polyaluminum hydroxide and/or polyaluminum chloride is contained in an amount within the range of from 0.01 to 5 $g/m^2$.

10. A recording medium, comprising a surface layer composed mainly of aluminum oxide particles having a particle size of 5 $\mu m$ or less provided on a liquid absorptive base paper, said surface layer coated within the range of 0.3 to 7 $g/m^2$ as the total amount of the pigments, said aluminum oxide particles having a BET surface area within the range of 60 to 170 $m^2/g$, the liquid absorptive base paper having an ash content of 1 to 20 $g/m^2$, and wherein the surface layer is in a mixture of aluminum oxide particles with the paper fibrous material of the base paper, and said recording medium further having a Stöckigt sizing degree according to JIS-P-8122 of 0 to 15 seconds.

11. A recording medium according to claim 10, wherein said aluminum oxide particles have particle sizes of 1 $\mu m$ or less.

12. A recording medium according to claim 10, wherein the aluminum oxide particles comprises not less than 80% by weight of all the pigments in the surface layer.

* * * * *

UNITED STATES PATENT AND TRADEMARK OFFICE

CERTIFICATE OF CORRECTION

PATENT NO. : 5,266,383 Page 1 of 3

DATED : November 30, 1993

INVENTOR(S) : Sakaki et al.

It is certified that error appears in the above-indentified patent and that said Letters Patent is hereby corrected as shown below:

COLUMN 1:

Line 30, "absorbina" should read --absorbing--.

COLUMN 2:

Line 5, "Droblem" should read --problem--; and
Line 9, "JaDanese" should read --Japanese--.

COLUMN 3:

Line 15, "suecific" should read --specific--.

COLUMN 4:

Line 11, "inhibitina" should read --inhibiting--; and
Line 49, "partices" should read --particles--.

COLUMN 5:

Line 20, "particles" should read --pigments--; and
Line 52, "0.3 g/$m^2$,there" should read --0.3 g/$m^2$, there--.

COLUMN 6:

Line 43, "an" should read --a--; and
Line 67, "1/2" should read --1/4--.

UNITED STATES PATENT AND TRADEMARK OFFICE

CERTIFICATE OF CORRECTION

PATENT NO. : 5,266,383 Page 2 of 3

DATED : November 30, 1993

INVENTOR(S) : Sakaki et al.

It is certified that error appears in the above-indentified patent and that said Letters Patent is hereby corrected as shown below:

COLUMN 7:

Line 1, "1/2," should read --1/4,--;
Line 38, "droulets" should read --droplets--;
Line 42, "paoer" should read --paper--;
Line 45, "characteristic" should read --characteristic.--; and
Line 48, "recordina" should read --recording--.

COLUMN 8:

Line 30, "larae" should read --large--;
Line 34, "the" should be deleted; and
Line 35, "in aspect" should read --with respect to--.

COLUMN 9:

Line 33, "$(AlCl_{3-b}]$ should read --$[AlCl_{3-b}]$--.

COLUMN 10:

Line 12, "imaae" should read --image--; and
Line 51, "above" should be deleted; and "forth" should read --forth above--.

COLUMN 13:

Line 53, "0." should read --O.--.

UNITED STATES PATENT AND TRADEMARK OFFICE

CERTIFICATE OF CORRECTION

PATENT NO. : 5,266,383 Page 3 of 3

DATED : November 30, 1993

INVENTOR(S) : Sakaki et al.

It is certified that error appears in the above-indentified patent and that said Letters Patent is hereby corrected as shown below:

COLUMN 14:

Line 28, "produced" should read --produced by--.

COLUMN 17:

Line 28, "7 $gm/m^2$" should read --7 $g/m^2$--.

COLUMN 18:

Line 58, "comprises" should read --comprise--.

Signed and Sealed this

Twenty-sixth Day of July, 1994

Attest:

BRUCE LEHMAN

Attesting Officer

Commissioner of Patents and Trademarks